US011629207B2

(12) United States Patent
Tahon et al.

(10) Patent No.: US 11,629,207 B2
(45) Date of Patent: Apr. 18, 2023

(54) RUBBER COMPOSITION AND A TIRE

(71) Applicant: The Goodyear Tire & Rubber Company, Akron, OH (US)

(72) Inventors: Julia Martine Francoise Claudine Tahon, Reckange (LU); Christian Jean-Marie Kaes, Schrondweiler (LU); James Joseph Golden, North Canton, OH (US); Thomas Günther Böhner, Frankfurt am Main (DE)

(73) Assignee: THE GOODYEAR TIRE & RUBBER COMPANY

( * ) Notice: Subject to any disclaimer, the term of this patent is extended or adjusted under 35 U.S.C. 154(b) by 238 days.

(21) Appl. No.: 17/119,542

(22) Filed: Dec. 11, 2020

(65) Prior Publication Data

US 2021/0179748 A1 Jun. 17, 2021

Related U.S. Application Data

(60) Provisional application No. 62/947,056, filed on Dec. 12, 2019.

(51) Int. Cl.
| | | |
|---|---|---|
| *C08K 3/04* | (2006.01) | |
| *C08K 3/36* | (2006.01) | |
| *C08K 3/22* | (2006.01) | |
| *C08K 5/098* | (2006.01) | |
| *C08K 9/06* | (2006.01) | |
| *C08L 7/00* | (2006.01) | |
| *B60C 9/00* | (2006.01) | |
| *C08F 136/08* | (2006.01) | |
| *C08K 5/3492* | (2006.01) | |
| *B60C 1/00* | (2006.01) | |

(52) U.S. Cl.
CPC .......... *C08F 136/08* (2013.01); *B60C 9/0007* (2013.01); *C08K 3/04* (2013.01); *C08K 3/22* (2013.01); *C08K 3/36* (2013.01); *C08K 5/098* (2013.01); *C08K 5/34922* (2013.01); *C08K 9/06* (2013.01); *C08L 7/00* (2013.01); *B60C 2001/0083* (2013.01); *C08K 2003/2296* (2013.01); *C08K 2201/006* (2013.01)

(58) Field of Classification Search
CPC .............. C08K 3/04; C08K 3/36; C08K 3/22; C08K 9/06; C08K 5/098; C08L 7/00; B60C 9/00
USPC ........................................................ 523/156
See application file for complete search history.

(56) References Cited

U.S. PATENT DOCUMENTS

| | | | |
|---|---|---|---|
| 5,394,919 A | 3/1995 | Sandstrom et al. | |
| 7,000,661 B2 | 2/2006 | Segatta et al. | |
| 7,249,621 B2 | 7/2007 | Sandstrom | |
| 2006/0169382 A1* | 8/2006 | Sandstrom | C08J 5/10 152/565 |
| 2007/0142518 A1* | 6/2007 | Hsu | C08K 9/06 523/213 |
| 2009/0151838 A1* | 6/2009 | Sandstrom | B60C 9/08 152/451 |
| 2009/0151883 A1 | 6/2009 | Nomura | |
| 2020/0070579 A1 | 3/2020 | Tahon et al. | |

FOREIGN PATENT DOCUMENTS

| | | |
|---|---|---|
| CN | 103665487 A | 3/2014 |
| CN | 105367851 A | 3/2016 |
| EP | 1228898 A1 | 8/2002 |
| EP | 1459907 A1 | 9/2004 |
| EP | 1685980 B1 | 1/2006 |
| EP | 1685980 A1 | 8/2006 |
| EP | 2072282 A1 | 12/2008 |
| EP | 2502755 B1 | 3/2012 |
| EP | 2712887 A1 | 4/2014 |
| EP | 2712887 B1 | 11/2017 |
| EP | 2990436 B1 | 8/2018 |
| EP | 3620308 A1 | 3/2020 |
| KR | 20040011258 A | 2/2004 |

OTHER PUBLICATIONS

European Search Report dated Jun. 15, 2021 for European Patent Application No. EP20213233, which is the European counterpart to the subject patent application.
Chinese Office Action dated Jul. 4, 2022 of Chinese Patent Application No. 202010573001.0 which is related to the subject U.S. patent application.

* cited by examiner

*Primary Examiner* — Deve V Hall
(74) *Attorney, Agent, or Firm* — Alvin T. Rockhill

(57) ABSTRACT

The present invention is directed to a non-vulcanized rubber composition which is comprised of (1) 90 phr to 100 phr cis 1,4-polyisoprene; (2) 10 phr to 40 phr of pre-silanized precipitated silica; (3) 10 phr to 40 phr of carbon black, (4) 0.1 phr to 5 phr of a cobalt salt, and (5) 1 phr to 15 phr of a resinous reaction product of a methylene donor composition and a methylene acceptor composition. Moreover, the present invention is directed to a tire or tire component comprising the cured rubber composition.

20 Claims, 1 Drawing Sheet

RUBBER COMPOSITION AND A TIRE

This application claims benefit of U.S. Provisional Patent Application Ser. No. 62/947,056, filed on Dec. 12, 2019. The teachings of U.S. Provisional Patent Application Ser. No. 62/947,056 are incorporated herein by reference in their entirety.

FIELD OF THE INVENTION

The present invention relates to a rubber composition or non-vulcanized (non-productive) rubber composition for a rubber product, such as a tire or a tire component. In particular, the rubber composition may be provided in a tire ply or ply strip, such as a carcass ply, a belt ply, a breaker ply, an overlay ply or a ply strip. A tire may comprise such a rubber composition and/or ply or ply strip.

BACKGROUND OF THE INVENTION

While tire performance has improved significantly over decades and the use of silica in tire compounds has resulted in rolling resistance improvements, there is still remains significant room for further improvement. In particular, in an effort to further reduce vehicle emissions, there is a desire to further reduce the rolling resistance of tires for used in multiple applications, including primarily passenger car tires and also truck tires. However, it is an important objective for such a reduction in rolling resistance to be attained without compromising other tire performance characteristics, such as handling, traction on both wet and dry surfaces, and treadwear (tire service life).

SUMMARY OF THE INVENTION

One object of the present invention may be to provide an advanced rubber composition for a tire ply or ply strip, in particular for plies of ply strips comprising metal reinforcements.

Another object of the present invention may be to provide a rubber composition, in particular for a tire ply or ply strip exhibiting limited hysteresis and/or resulting in advanced rolling resistance performance.

The scope of protection of the present invention is defined by the independent claims, further preferred embodiments are recited in the dependent claims and the aspects and embodiments provided in the summary and description herein below.

In a first aspect, the present invention is directed to a non-vulcanized rubber composition comprising (1) 90 to 100 phr of cis 1,4-polyisoprene; (2) 10 to 40 phr of pre-silanized precipitated silica; (3) 10 to 40 phr of carbon black, (4) 0.1 phr to 5 phr of a cobalt salt, and (5) 1 to 15 phr of a resinous reaction product of a methylene donor composition and a methylene acceptor composition.

Such compositions have particularly proven to be desirable as rubber coat compositions in plies or ply strips for tires, in particular plies comprising metal cords/wires such a brass-coated steel wires.

In one embodiment, the resinous reaction product of the methylene donor composition and the methylene acceptor composition is formed in situ within the non-vulcanized rubber composition. This resinous reaction product results in a network providing increased stiffness and hardness in the rubber.

In another embodiment, the methylene donor composition is comprised of (or in other words comprises) hexamethoxymethylmelamine (HMMM).

In still another embodiment, the hexamethoxymethylmelamine is present in the methylene donor composition at a level of at least 50 weight, preferably at a level of at least 80 weight percent or even more preferably at a level of at least 90 weight percent.

In yet another embodiment, the methylene donor composition consists of hexamethoxymethylmelamine. In other words, the hexamethoxymethylmelamine represents the only or essentially the only constituent of the methylene donor composition.

In yet another embodiment, the methylene donor composition is comprised of hexamethoxymethylmelamine and up to 50 weight percent of one or more methylene donor compounds selected from the group consisting of hexamethylenetetramine, methoxymethylmelamaine, N,N'N"-trimethyl N,N'N"-trimethylolmelamine, hexamethyolmelanime, N,N'N"-dimethylolmelamine, N-methylolmelamine, N,N'-dimethylolmelamine, N,N'N"-tris(methoxymethyl)melamine, N,N'N"-tributyl-N,N'N"-trimethylol-melamine, and hexaethoxymethylmelamine.

In still another embodiment, the methylene acceptor composition is comprised of at least one member selected from the group consisting of resorcinol, resorcinol derivatives, monohydric phenols and their derivatives, dihydric phenols and their derivatives, polyhydric phenols and their derivatives, unmodified phenol novolak resins, modified phenol novolak resin, and rescorcinol novolak resins.

In yet another embodiment, the methylene acceptor composition is comprised of resorcinol. Such a reactive resin combination has been found to be of particular interest.

In yet another embodiment of the present invention, the rubber composition is further comprised of 5 phr to 15 phr of zinc oxide, preferably 8 phr to 15 phr. These relatively high amounts of zinc oxide are particularly desirable in applications where brass coated metal wire is utilized to reinforce plies which are comprised of the rubber composition.

In still another embodiment, the rubber composition is further comprised of at least one anti-degradant, such as an antioxidant and/or antiozonant.

In still another embodiment, the pre-silanized precipitated silica has a CTAB adsorption surface area which is within the range of 130 $m^2/g$ to 210 $m^2/g$. The CTAB surface can be suitably measured in accordance with ASTM D6845 or equivalent.

In still another embodiment, said pre-silanized precipitated silica is precipitated silica which is pre-reacted (or pre-treated) with a sulfur-containing silane.

In still another embodiment, the sulfur-containing silane is comprised of bis(3-triethoxysilylpropyl)polysulfide containing an average of from 2 to 5 connecting sulfur atoms in its polysulfidic bridge.

In yet another embodiment, the sulfur-containing silane is an alkoxyorganomercaptosilane.

In yet another embodiment, the composition comprises from 15 to 30 phr of the pre-silanized precipitated silica and from 15 to 30 phr of the carbon black. Preferably, the composition comprises between 20 phr to 25 phr of the carbon black and 20 phr to 25 phr of the pre-silanized precipitated silica.

In still another embodiment, the composition comprises at least 90 phr of (cis 1,4-polyisoprene) natural rubber, or preferably at least 95 phr of natural rubber.

In still another embodiment, the ratio of pre-silanized silica to carbon black ranges between 1.2 to 1 and 1 to 1.2.

In still another embodiment, the rubber composition comprises less than 10 phr, preferably less than 5 phr oil.

In another aspect, the present invention is directed to a non-vulcanized rubber composition further comprises from 4 phr to 15 phr of sulfur and at least one cure accelerator. Instead of being non-vulcanized, the rubber composition could also, in general, be described as uncured, vulcanizable, non-sulfur vulcanized or sulfur vulcanizable.

In yet another embodiment, sulfur is present at a level of at least 6 phr and at most 10 phr or 9 phr in the composition, in particular in the productive composition. A productive rubber composition is considered to be a rubber formulation that will cure upon being heated to an elevated curing temperature (the productive rubber composition contains curatives) while a non-productive is not capable of being cured due to the lack of the presence of curatives.

In yet another embodiment, the methylene donor composition is added in a non-productive mixing step (or in other words in the non-productive rubber composition) and the methylene acceptor composition is added in a productive mixing step (i.e. in the productive rubber composition). In particular, the resinous reaction product may be formed in the productive mixing step.

In another embodiment, the methylene acceptor composition is added in a non-productive mixing step and the methylene donor composition is added in a productive mixing step. In particular, the resinous reaction product may be formed in the productive mixing step.

In yet another embodiment, the methylene acceptor composition and the methylene donor composition are added in a non-productive mixing step. In particular, the resinous reaction product may already be formed in the non-productive mixing step.

In still another embodiment, the methylene acceptor composition and the methylene donor composition are added in a productive mixing step such that the resinous reaction product may be formed in the productive mixing step.

In another aspect, the present invention is directed to a non-vulcanized or vulcanized rubber component, the rubber component comprising metal reinforcing elements, which are embedded in the rubber composition. In particular, the metal elements may be coated on both sides or all sides with the (non-vulcanized) rubber composition. The rubber composition may be cured together with the metal reinforcing element being embedded therein.

In still a further embodiment, the rubber component is a rubber ply or rubber ply strip which may also be a gum strip.

In yet another embodiment, the metal reinforcing element is brass coated steel wire.

In an embodiment, the rubber composition comprises an additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one embodiment, a synthetic or natural polyisoprene rubber may be used. Synthetic cis 1,4-polyisoprene and cis 1,4-polyisoprene natural rubber are as such well known to those having skill in the rubber art. In particular, the cis 1,4-microstructure content may be at least 90%, and in many cases will be at least 95%.

In one embodiment, cis 1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis 1,4-content ("high cis" content) and a glass transition temperature (Tg) in a range of from −95 to −110° C. Suitable cis-1,4-polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickle catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A reference to a glass transition temperature, or Tg, of an elastomer or elastomer composition, where referred to herein, represents the glass transition temperature(s) of the respective elastomer or elastomer composition in its uncured state or possibly a cured state in the case of an elastomer composition. A Tg can be suitably determined as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer." In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr of one or more additional diene-based rubbers, such as SBR, SSBR, ESBR, PBD/BR, NR and/or synthetic polyisoprene. In another example, the composition may include less than 5 phr, preferably less than 3 phr, of an additional diene-based rubber or can also be essentially free of such an additional diene-based rubber. The terms "compound" and "composition" may be used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils. If used, the rubber composition may also include less than 10 phr oil, preferably less than 5 phr.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area can be suitably determined according to ASTM D6556 or equivalent and is described in the Journal of the American Chemical Society, Volume 60, Page 304 (1930). The conventional silica may also be characterized by having a dibutylphthalate (DBP) absorption value in a range of 100 cm$^3$/100 g to 400 cm$^3$/100 g, alternatively 150 cm$^3$/100 g to 300 cm$^3$/100 g which can be suitably determined according to ASTM D 2414 or equivalent. A conventional silica might be expected to have an average ultimate particle size, for example, in the range of 0.01 to 0.05 micron as determined by the electron microscope, although the silica particles may be even smaller, or possibly larger, in size. Ranges of silica use could be for instance between 5 phr and 120 phr, preferably in a range of between 20 phr and 70 phr or 80 phr to 120 phr. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc. and silicas available from Evonik AG with, for example, designations VN2 and Ultrasil 6000GR, 9100GR, etc.

In accordance with the invention, the rubber composition comprises pre-silanized and precipitated silica which may for instance have a CTAB adsorption surface area of between 130 m$^2$/g and 210 m$^2$/g, optionally between 130 m$^2$/g and 150 m$^2$/g and/or between 190 m$^2$/g and 210 m$^2$/g, or even between 195 m$^2$/g and 205 m$^2$/g. The CTAB (cetyl trimethyl ammonium bromide) method for determination of the silica surface area (ASTM D6845) is known to the person skilled in the art.

In another embodiment, the pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes.

In an alternative embodiment, the pre-hydrophobated precipitated silica may be pre-treated with a silica coupling agent comprised of, for example, an alkoxyorganomercaptoalkoxysilane or combination of alkoxysilane and organomercaptoalkoxysilane prior to blending the pre-treated silica with the rubber instead of reacting the precipitated silica with the silica coupling agent in situ within the rubber. For example, see U.S. Pat. No. 7,214,731, the teachings of which are incorporated herein for the purpose of describing pre-hydrophobated precipitated silica and techniques for making such pre-hydrophobated precipitated silica.

In another embodiment, said pre-silanized precipitated silica is precipitated silica pre-reacted with a silica coupler comprised of bis(3-triethoxysilylpropyl)polysulfide containing an average of from 1 to 5 connecting sulfur atoms (preferably 2 to 4) in its polysulfidic bridge or an alkoxyorganomercaptosilane.

The mercaptosilane which contains mercaptan groups (—SH groups) may improve compatibility with the rubber material or rubber matrix and/or support the curing process.

The amount mercapto groups on the surface of the silica may be in the range of between 0.1 and 1 weight percent, alternatively 0.4 to 1 weight percent or 0.4 to 0.6 weight percent.

In addition to mercapto groups coupled to the silica, the silica may comprise a compatibilizer which is typically a (hydro-)carbon chain material having multiple carbon atoms (for instance at least 4 carbon atoms) along its chain. Such a compatibilizer may facilitate the mixing of the composition. In an example, the weight percent of carbon surface load/functionalization is between 2 and 10, or alternatively between 3 and 8.

The prehydrophobated precipitated silica may optionally be treated with a silica dispersing aid. Such silica dispersing aids may include glycols, such as fatty acids, diethylene glycols, polyethylene glycols, fatty acid esters of hydrogenated or non-hydrogenated $C_5$ or $C_6$ sugars, and polyoxyethylene derivatives of fatty acid esters of hydrogenated or non-hydrogenated $C_5$ or $C_6$ sugars. Exemplary fatty acids include stearic acid, palmitic acid and oleic acid. Exemplary fatty acid esters of hydrogenated and non-hydrogenated $C_5$ and $C_6$ sugars (e.g., sorbose, mannose, and arabinose) include, but are not limited to, the sorbitan oleates, such as sorbitan monooleate, dioleate, trioleate and sesquioleate, as well as sorbitan esters of laurate, palmitate and stearate fatty acids. Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups.

The optional silica dispersing aids, if used, are present in an amount ranging from about 0.1% to about 25% by weight based on the weight of the silica, with about 0.5% to about 20% by weight being suitable, and about 1% to about 15% by weight based on the weight of the silica also being suitable. Various pre-treated precipitated silicas are described in U.S. Pat. Nos. 4,704,414, 6,123,762 and 6,573,324. The teachings of U.S. Pat. Nos. 4,704,414, 6,123,762 and 6,573,324 are incorporated herein by reference.

In another embodiment, the pre-hydrophobated precipitated silica is pre-hydrophobated by treating silica in an aqueous colloidal form thereof with both an organomercaptosilane and an alkylsilane in a weight ratio of said organomercaptosilane to said alkylsilane in a range of from 10/90 to 90/10; wherein said alkylsilane is of the general Formula (I):

$$X_n-Si-R_{4-n} \quad (I),$$

wherein R is an alkyl radical having from 1 to 18 carbon atoms, preferably from 1 to 8, carbon atoms, such as, methyl, ethyl, isopropyl, n-butyl and octadecyl radicals, n is a numeral from 1 to 3 and X is a radical selected from halogens, namely chlorine or bromine, preferably a chlorine radical, and alkoxy radicals, preferably an alkoxy radical as $(R^1O)$—, wherein $R^1$ is an alkyl radical having from 1 to 3 carbon atoms, such as, methyl, ethyl and isopropyl radicals, preferably from methyl and ethyl radicals, and where said organomercaptosilane is of the general formula (II):

$$(X)_n(R^2O)_{3-n}-Si-R^3-SH \quad (II),$$

wherein X is a radical selected from halogens, such as chlorine or bromine, preferably a chlorine radical, and alkyl radicals having from 1 to 16 carbon atoms, preferably selected from methyl, ethyl, n-propyl, and n-butyl radicals; wherein $R^2$ is an alkyl radical having from 1 to 16 carbon atom, preferably from 1 to 4 carbon atoms, preferably selected from methyl and ethyl radicals and $R^3$ is an alkylene radical having from 1 to 16 carbon atoms, preferably from 1 to 4 carbon atoms, preferably a propylene radical; wherein n represents an integer from 0 to 3 with n preferably representing zero.

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid Condensed Chemical Dictionary and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative organomercaptosilanes of Formula (II) are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries. Some representative examples of preferred pre-silanized precipitated silicas include Agilon® 400, Agilon® 454 and Agilon® 458 from PPG Industries.

In an embodiment, the rubber composition is exclusive of addition of (added) precipitated silica to the rubber composition (thereby exclusive of addition of non-pre-silanized precipitated silica).

In another embodiment, the pre-silanized silica is not necessarily precipitated silica.

In one embodiment, the rubber composition is exclusive of addition of silica coupler to the rubber composition (thereby exclusive of silica coupler).

As indicated, in one embodiment, the rubber composition may contain a combination of additional silica coupler added to the rubber composition, particularly a bis(3-triethoxysilylpropyl) polysulfide containing an average of from about 2 to about 4 connecting sulfur atoms in its polysulfidic bridge together with an additional precipitated silica (non-pre-silanized precipitated silica) added to said rubber composition, wherein the ratio of pre-silanized precipitated silica to said precipitated silica is desirably at least 8/1, alternately at least 10/1.

Representative examples of carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and DBP number ranging from 34 cm$^3$/100 g to 150 cm$^3$/100 g. Iodine absorption values can be suitably determined according to ASTM D1510 or equivalent.

In one embodiment, the rubber composition may contain also a conventional sulfur containing organosilicon compounds or silanes. Examples of suitable sulfur containing organosilicon compounds are of the formula:

$$Z-Alk-S_n-Alk-Z \quad I$$

in which Z is selected from the group consisting of

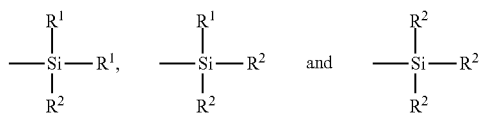

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

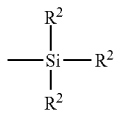

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608, 125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 to 20 phr. In one embodiment, the amount will range from 1 to 10 phr.

In another embodiment, the rubber composition comprises from 0.2 phr to 2 phr of a cobalt salt. This content may be of particular interest if used in ply coating compounds as it may amongst others improve the adhesion of the rubber coating to the ply or belt material, in particular if such material is metal, preferably brass coated metal as for instance steel. The cobalt compound will typically be a cobalt salt of a fatty acid or a cobalt salt of an aliphatic or alicyclic carboxylic acid containing from 6 to 30 carbon atoms. Some representative examples of cobalt compounds which may be used include the cobalt salts, cobalt naphthanate, cobalt linoleate, cobalt stearate, cobalt oleate, cobalt acetate, cobalt neodecanoate, cobalt tallate, cobalt resinate, cobalt acetonate, or in situ salts prepared from cobalt hydroxide and an organic acid such as naphthenic acid, stearic acid, oleic acid, acetic acid, linoleic acid and the like. Additional cobalt compounds which may be used are known under the tradename Manoband™ C. Manoband™ C is a cobalt complex of an organic acid containing boron manufactured by Manchem Company. Manoband™ C cobalt compounds are described in British Patent No. 972,804. The teachings of British Patent No. 972,804 are incorporated herein by reference in their entirety for the purpose of disclosing cobalt compounds that can be utilized in accordance with this invention.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5, phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one non-productive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages or composition, respectively, are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may for instance be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In another aspect, the present invention is directed to a tire which is comprised of a cured rubber which is made by curing the productive rubber composition comprising sulfur and accelerator.

In still another aspect of the present invention, a tire is provided, the tire comprising at least one of the following components: a ply (e.g. a breaker ply) and a ply strip (e.g. an overlay ply strip), wherein the component comprises wires being coated with a rubber composition (1) 90 phr to 100 phr of cis 1,4-polyisoprene; (2) 10 phr to 40 phr of pre-silanized precipitated silica; (3) 10 phr to 40 phr of carbon black, (4) 0.1 phr to 5 phr of a cobalt salt, and (5) 1 phr to 15 phr of a resinous reaction product of a methylene donor composition and a methylene acceptor composition. The term ply strip may include herein also gum strips.

In still another aspect of the present invention, a tire is provided, the tire comprising at least one of the following components: a ply (e.g. a breaker ply) and a ply strip (e.g. an overlay ply strip or gum strip), which comprises a rubber composition (1) 90 phr to 100 phr of cis 1,4-polyisoprene; (2) 10 phr to 40 phr of pre-silanized precipitated silica; (3) 10 phr to 40 phr of carbon black, (4) 0.1 phr to 5 phr of a cobalt salt, and (5) 1 phr to 15 phr of a resinous reaction product of a methylene donor composition and a methylene acceptor composition.

In yet another aspect of the present invention, a method is provided comprising one or more of the following steps:

(1) providing a non-vulcanized composition 90 phr to 100 phr of cis 1,4-polyisoprene, 10 phr to 40 phr of pre-silanized precipitated silica, 10 phr to 40 phr of carbon black, 0.1 phr to 5 phr of a cobalt salt, a methylene donor composition, a methylene acceptor composition;

(2) mixing the composition, in particular in at least one productive mixing step, to obtain rubber a composition comprising a resinous reaction product of the methylene donor composition and a methylene acceptor composition;

(3) coating a fabric or a plurality of wires arranged in parallel in a plane from both sides with the composition to obtain a reinforced rubber ply or reinforced rubber ply strip;

(4) applying the ply or the ply strip to an uncured tire; and (5) curing the tire or the ply or ply strip.

In one embodiment, the ply or ply strip comprises a plurality of essentially parallelly extending, and spaced apart from one another, metal wires coated with the rubber composition, wherein the plurality of metal wires define a plane of parallelly extending and spaced apart from one another metal wires which are calendered on both sides with the rubber composition.

In another embodiment, the tire is a passenger car tire, truck tire, airplane tire.

The features of the above aspects and/or embodiments may be combined with one another other.

BRIEF DESCRIPTION OF THE DRAWINGS

The structure, operation, and advantages of the invention will become more apparent upon contemplation of the following description taken in conjunction with the accompanying drawings, wherein.

DETAILED DESCRIPTION OF THE INVENTION

Figure 1:
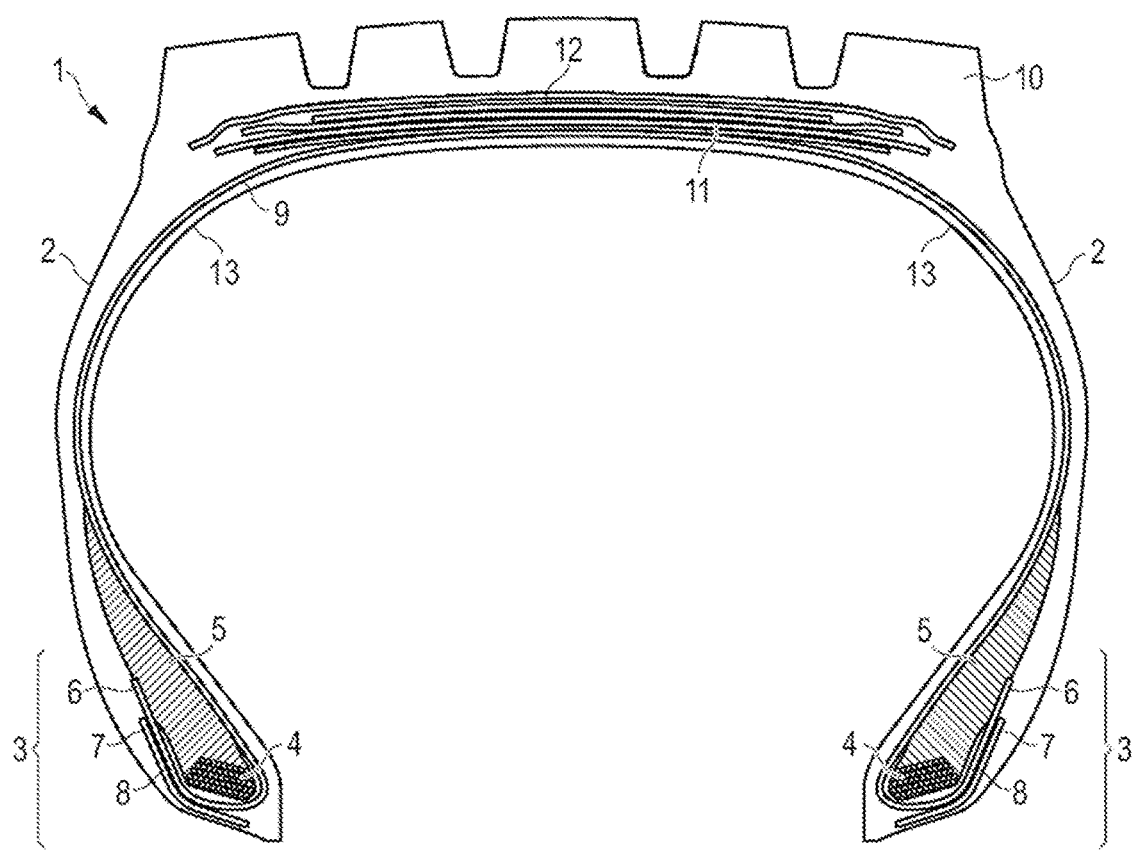
FIG. 1 is a schematic cross section of a tire comprising amongst others belt plies having the rubber composition in accordance with an embodiment of the invention.

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12 and/or may include one or more breaker plies. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. One or more of the carcass ply 9, belt/breaker plies 11 and overlay ply 12 comprise a rubber composition in accordance with the invention and may have a plurality of substantially parallel reinforcing members made of metal wire. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The main portion of the tread 10 may be formed of one or more tread compounds, which may be any suitable tread compound or compounds.

While the embodiment of FIG. 1 suggests a plurality of tire components including for instance apexes 5, chippers 7, flippers 8 and overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves.

Figure 2:
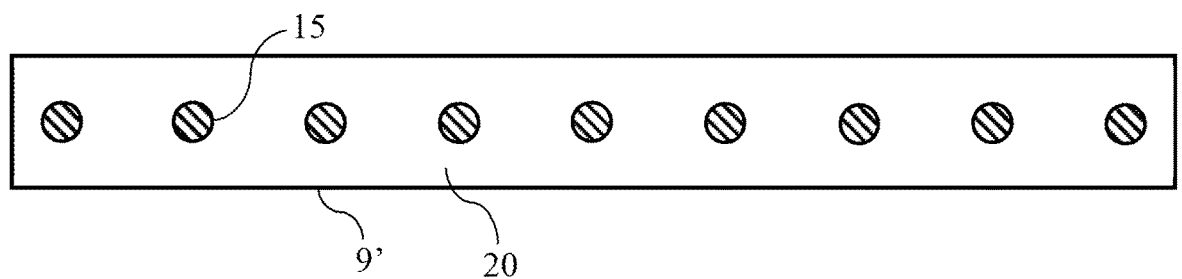
FIG. 2 is a schematic cross section of a ply comprising wires and a wire coat material rubber composition in accordance with an embodiment of the invention.

The schematic cross-section of FIG. 2 shows a ply, e.g. a carcass, belt (in particular breaker ply) or overlay ply 9' which comprises a plurality of metal, for instance steel, wires 15 reinforcing the rubber composition/wire coat 20. Typically, such a ply is made in a wire calendar in which a plurality of essentially parallel metal and spaced apart wires is coated from both sides with a layer or sheet of rubber composition 20. Such methods are well known to the person skilled in the art of tire building. After curing, the wires 15 are embedded in the rubber composition 20, reinforcing the same. However, in another embodiment, the rubber composition could also be provided in a rubber ply or rubber ply strip which is not reinforced by (metal) wires.

Metal wires 15 may be coated with brass for better adhesion properties with regards to connection of the wires 15 to the cured rubber composition 20. The wires 15 may also be dipped in dipping solutions or emulsions for better adhesion properties as known in the art. Neither a dip nor a metal coating is shown here in FIG. 2. For the sake of better adhesion of the compound 20 to the metal wire 15, the compound 20 may comprise a cobalt salt. Moreover, the compound 20 can comprise zinc oxide which may also improve the adhesion between the metal wire 15 and the cured compound 20.

While the schematic drawing of FIG. 2 indicates nine wires, the number of parallel wires per ply could be different, for instance at least 5 or 10. The invention could also be used in a ply strip comprising the rubber composition, with the strip comprising only between 3 and 6 cords or wires.

Table 1 shows examples of a rubber composition in accordance with examples of the present invention. Control Sample 1 and Control Sample 2 constitute wire coat rubber compositions in the absence of a resin and utilizing carbon black in relatively high quantities of 60 phr. Control Sample 1 is comprised of 100 phr natural rubber, while Control Sample 2 comprises a blend of natural rubber and synthetic cis-1,4 polyisoprene. Control Sample 3 comprises a reactive resin system and precipitated silica together with 100 phr natural rubber. Control Sample 4 is also a full natural rubber examples comprising the same reactive resin system but comprise 24 phr carbon black together with 23 phr silica as filler material. In Control Samples 3 and 4 appropriate amounts of silane have been added to the composition. In contrast to all control samples, the Inventive Examples 1 and 2 comprise a combination of a pre-silanized silica in combination with carbon black. In these non-limiting examples, equal parts of silica and carbon black (23 phr) have been added to the composition. Inventive Example 2 differs over Inventive Example 1 in that it comprises a blend of natural rubber and synthetic polyisoprene, while Inventive Example 1 is a full natural rubber compound.

TABLE 1

|  | Parts by weight (phr) | | | | | |
| --- | --- | --- | --- | --- | --- | --- |
| Material | Control Sample 1 | Control Sample 2 | Control Sample 3 | Control Sample 4 | Inventive Example 1 | Inventive Example 2 |
| Natural Rubber | 100 | 60 | 100 | 100 | 100 | 60 |
| Synthetic cis 1,4-polyisoprene | 0 | 40 | 0 | 0 | 0 | 40 |
| Pre-Silanized Silica[1] | 0 | 0 | 0 | 0 | 23 | 23 |
| Carbon Black | 60 | 60 | 4 | 24 | 23 | 23 |
| Precipitated silica[2] | 0 | 0 | 43 | 23 | 0 | 0 |
| Silane[3] | 0 | 0 | 5.2 | 2.8 | 0 | 0 |
| Cobalt Salt | 1 | 1 | 0.5 | 0.5 | 0.5 | 0.5 |
| Antidegradants | 2 | 2 | 2.5 | 2.5 | 2.5 | 2.5 |
| Methylene donor[4] | 0 | 0 | 4.1 | 4.1 | 4.1 | 4.1 |
| Methylene acceptor[5] | 0 | 0 | 1.5 | 1.5 | 1.5 | 1.5 |
| Accelerators | 1 | 1.2 | 1.8 | 1.8 | 1.8 | 2.0 |
| ZnO | 10 | 10 | 10 | 10 | 10 | 10 |
| Sulfur | 6.3 | 6.3 | 6.3 | 6.3 | 6.9 | 6.9 |

[1]Pre-silanized (pre-hydrophobated) precipitated silica as Agilon 400 ™ from PPG Industries as precipitated silica chemically treated with an alkoxyorganomercaptosilane

[2]Precipitated silica as Zeosil ™ 1165 MP from the company Solvay

[3]Bis-triethyoxysilylpropyl tetrasulfideas SI 69 ™ from the company Evonik

[4]Hexamethoxymethylmelamine

[5]100% phenol formaldehyde reactive type resin

Table 2 shows test data for the compositions listed above in Table 1.

Shore A hardness is on a similar level for all tested samples. G' levels, which may be considered as stiffness indicators, are significantly higher for the Inventive Examples. Such an increased stiffness could amongst others help to improve steering performance. Most remarkable are the differences in tangent delta which are an indicator for improved hysteresis and thus also for improved rolling resistance. In particular, the Inventive Examples show a decrease in tangent delta which range roughly between −20% and −40% with respect to the control samples. While tensile strength and elongation at break have decreased for the inventive examples as well, those are still deemed to be at an appropriate level. Modulus measurements are at a comparable level with the exception of the almost full silica example of Control Sample 3 which is less favorable. In summary, the combination of a pre-silanized silica, carbon black and a resin, as exemplarily shown in the below Inventive Examples, results in a considerably advanced hysteresis behavior and thus in improved rolling resistance.

TABLE 2

| Test/Property | Units | Control Sample 1 | Control Sample 2 | Control Sample 3 | Control Sample 4 | Inventive Example 1 | Inventive Example 2 |
|---|---|---|---|---|---|---|---|
| Shore A hardness (23° C.)[a] | — | 66 | 68 | 67 | 71 | 67 | 70 |
| G' (1%)[b] | MPa | 1849 | 2237 | 1981 | 1942 | 2613 | 2989 |
| G' (15%)[b] | MPa | 1072 | 1159 | 1177 | 1112 | 1585 | 1695 |
| Tan delta (10%)[b] | — | 0.17 | 0.18 | 0.16 | 0.18 | 0.11 | 0.12 |
| Modulus (100%)[c] | MPa | 3.1 | 3.2 | 2.3 | 3.4 | 3.3 | 3.3 |
| Modulus (200%)[c] | MPa | 8.1 | 7.9 | 5.5 | 8.3 | 8.2 | 7.6 |
| Elongation at break[c] | % | 316 | 374 | 506 | 435 | 277 | 297 |
| Tensile strength[c] | MPa | 13.3 | 15.8 | 17.6 | 20.6 | 11.3 | 11.4 |

[a]Shore A hardness measured according to ASTM D2240 or equivalent.
[b]Data obtained with an RPA 2000 ™ Rubber Process Analyzer of Alpha Technologies based on ASTM D5289; percentages are percentages of strain; Tan delta has been determined at 100° C..
[c]Ring sample test based on ASTM D412 or equivalent, percentages are percentages of elongation, respectively strain; tensile strength is stress at break; elongation is elongation at break in %.

While certain representative embodiments and details have been shown for the purpose of illustrating the subject invention, it will be apparent to those skilled in this art that various changes and modifications can be made therein without departing from the scope of the subject invention.

What is claimed is:

1. A non-vulcanized rubber composition which comprises: (1) 90 phr to 100 phr of cis 1,4-polyisoprene; (2) 10 phr to 40 phr of pre-silanized precipitated silica; (3) 10 phr to 40 phr of carbon black, (4) 0.1 phr to 5 phr of a cobalt salt, and (5) 1 phr to 15 phr of a resinous reaction product of a methylene donor composition and a methylene acceptor composition, wherein the pre-silanized precipitated silica has a CTAB adsorption surface area which is within the range of 130 m$^2$/g to 210 m$^2$/g.

2. The non-vulcanized rubber composition as specified in claim 1 wherein the resinous reaction product of the methylene donor composition and the methylene acceptor composition is formed in situ within the rubber composition.

3. The non-vulcanized rubber composition as specified in claim 2 wherein the methylene donor composition is comprised of hexamethoxymethylmelamine.

4. The non-vulcanized rubber composition as specified in claim 3 wherein the hexamethoxymethylmelamine is present in the methylene donor composition at a level of at least 80 weight percent.

5. The non-vulcanized rubber composition as specified in claim 2 wherein the methylene donor composition is comprised of hexamethoxymethylmelamine and up to 50 weight percent of one or more methylene donor compounds selected from the group consisting of hexamethylenetramine, methoxymethylmelamaine, N,N'N"-trimethyl N,N'N"-trimethylolmelamine, hexamethyolmelanime, N,N'N"-dimethylolmelamine, N-methylolmelamine, N,N'-dimethylolmelamine, N,N'N"-tris(methoxymethyl)melamine, N,N'N"-tributyl-N,N'N"-trimethylol-melamine and hexaethoxymethylmelamine.

6. The non-vulcanized rubber composition as specified in claim 2 wherein the methylene acceptor composition is comprised of at least one member selected from the group consisting of resorcinol, resorcinol derivatives, monohydric phenols and their derivatives, dihydric phenols and their derivatives, polyhydric phenols and their derivatives, unmodified phenol novolak resins, modified phenol novolak resin, and rescorcinol novolak resins.

7. The non-vulcanized rubber composition as specified in claim 1 wherein the non-vulcanized rubber composition further comprises 5 phr to 15 phr of zinc oxide.

8. The non-vulcanized rubber composition as specified in claim 1 wherein the non-vulcanized rubber composition comprises 15 phr to 30 phr of the pre-silanized precipitated silica and 15 phr to 30 phr of the carbon black.

9. The non-vulcanized rubber composition as specified in claim 1 wherein the non-vulcanized rubber composition comprises from 90 phr to 100 phr of natural rubber.

10. The non-vulcanized rubber composition as specified in claim 1 wherein a ratio of the pre-silanized precipitated silica to the carbon black ranges between 1.20 to 1 and 1 to 1.2.

11. The non-vulcanized rubber composition as specified in claim 1 wherein the non-vulcanized rubber composition comprises less than 10 phr oil.

12. The non-vulcanized rubber composition as specified in claim 1 wherein said pre-silanized precipitated silica is precipitated silica which is pre-reacted with a sulfur-containing silane.

13. The non-vulcanized rubber composition as specified in claim 12 wherein the sulfur-containing silane is comprised of bis(3-triethoxysilylpropyl)polysulfide containing an average of from 2 to 5 connecting sulfur atoms in its polysulfidic bridge.

14. The non-vulcanized rubber composition as specified in claim 12 wherein the sulfur-containing silane is an alkoxyorganomercaptosilane.

15. A reinforced rubber component which is comprised of a metal reinforcing element which is embedded in a cured rubber composition which is made by curing the metal reinforcing element in the non-vulcanized rubber composition specified in claim 1.

16. The reinforced rubber component as specified in claim 15 wherein the reinforced rubber component is a tire ply or a tire ply strip.

17. The reinforced rubber component as specified in claim 16 wherein the metal reinforcing element is a brass coated steel wire.

18. A tire having a rubber ply or rubber ply strip which is comprised of a cured rubber which is made by curing the non-vulcanized rubber composition specified in claim 1.

19. The non-vulcanized rubber composition as specified in claim 1 wherein the pre-silanized precipitated silica has a CTAB adsorption surface area which is within the range of 130 m$^2$/g to 150 m$^2$/g.

20. The non-vulcanized rubber composition as specified in claim 1 wherein the pre-silanized precipitated silica has a CTAB adsorption surface area which is within the range of 195 m$^2$/g to 205 m$^2$/g.

* * * * *